3,725,255
PROCESS FOR SEPARATING AROMATIC HYDROCARBONS FROM MIXTURES CONTAINING THEM BY LIQUID-LIQUID EXTRACTION AND AZEOTROPIC DISTILLATION
Filippo Barilli, Luigi Lugo, Lucio di Fiore, and Cesare Reni, Milan, Italy, assignors to Societa Italiana Resine, S.p.A., Milan, Italy
Filed May 4, 1971, Ser. No. 140,203
Claims priority, application Italy, May 12, 1970, 24,459/70
Int. Cl. C07c 7/10; C10g 21/20
U.S. Cl. 208—331               10 Claims

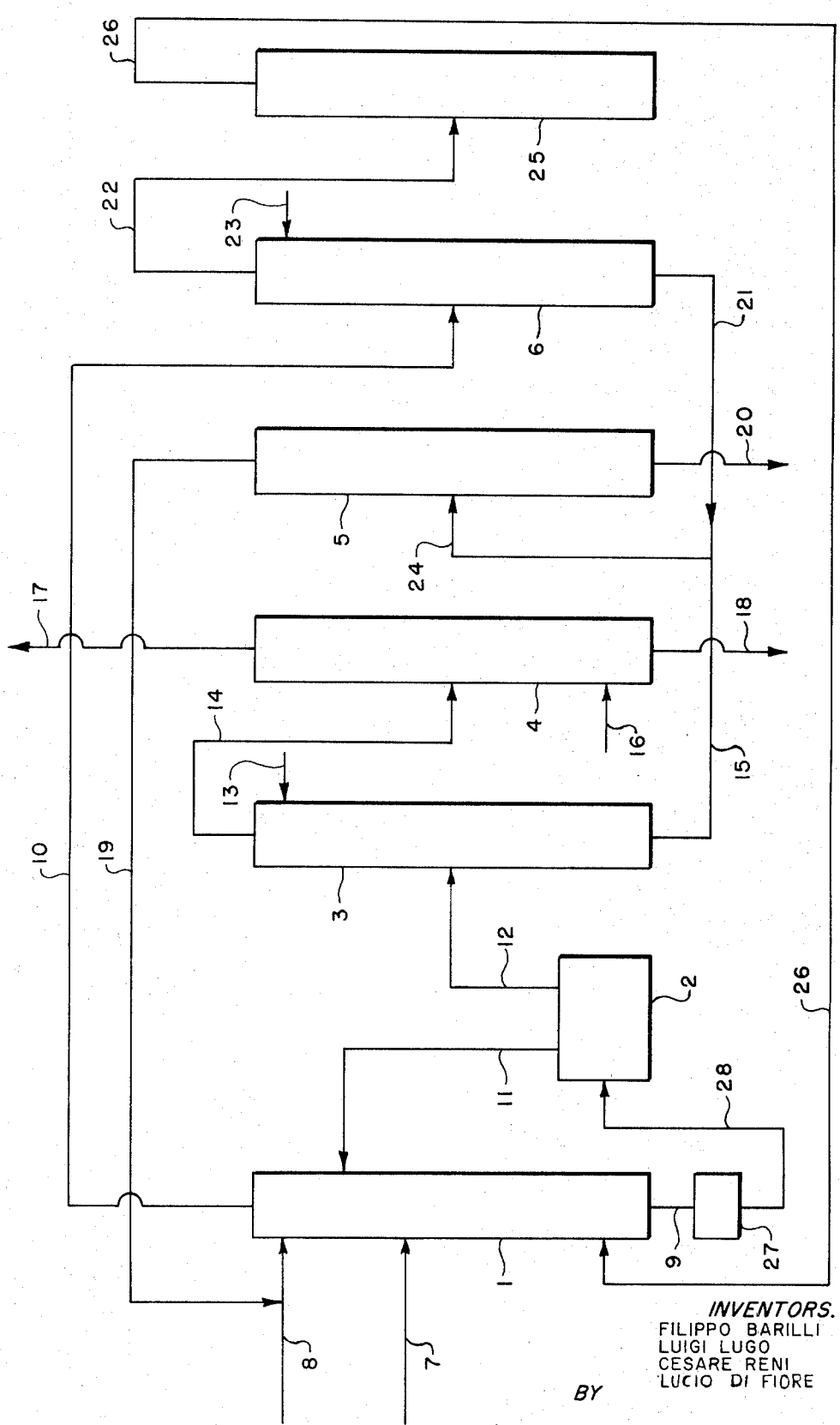

ABSTRACT OF THE DISCLOSURE

Aromatic hydrocarbons are separated from a mixture of liquid hydrocarbons. The mixture of liquid hydrocarbons is extracted in the liquid phase in an extraction zone at a temperature of about 40° C. to about 80° C. with ethylenediamine solvent having a water content of from 0% to 20% by weight to form an extracted phase and a raffinate phase. The extracted phase comprises predominantly aromatic hydrocarbons, solvent, and a minor amount of non-aromatic hydrocarbons. The raffinate phase comprises predominantly non-aromatic hydrocarbons. The extracted phase and the raffinate phase are separately collected. The extracted phase is cooled to a temperature at least 30° C. lower than the temperature of the extraction. The cooled extracted phase is then separated into a heavier solvent containing phase, and a lighter hydrocarbons containing phase which is scrubbed with water to obtain an aqueous ethylenediamine containing phase and a hydrocarbons phase. The hydrocarbons phase is azeotropically distilled to obtain an overhead product comprising non-aromatic hydrocarbons, and a bottom product consisting essentially of aromatic hydrocarbons which are subsequently rectified.

BACKGROUND OF THE INVENTION

Field of the invention

This invention relates to a means of separating aromatic hydrocarbons from a mixture thereof with paraffins and naphthene hydrocarbons by means of extraction with a selective solvent. This invention is particularly concerned with separating aromatic hydrocarbons, such as benzene, toluene and xylene, from liquid hydrocarbon mixture containing them.

Description of the prior art

Several liquid-liquid extraction and azeotropic distillation methods are known in the art for separating aromatic hydrocarbons from liquid hydrocarbon mixtures.

The azeotropic distillation methods employ a volatile solvent as a stripping agent for non-aromatic hydrocarbons.

There are several known methods employed on an industrial scale for separating mixtures of organic compounds which contain at least one constituent relatively soluble in a liquid solvent, by contacting the liquid mixtures with a liquid solvent in order to separate a raffinate phase from an extracted phase.

Previous methods have effected the separation by conveying the liquid mixtures to a liquid-liquid extractor countercurrent to a selective solvent. A raffinate phase and an extracted phase are collected, the raffinate phase consisting essentially of non-aromatic hydrocarbons, and the extracted phase having a high solvent and aromatic hydrocarbon content and a relatively low non-aromatic hydrocarbon content.

A number of high-boiling solvents have been used as the selective solvent in the extractive step. Among the solvents used in the past on the industrial scale are diethylene glycol, dipropylene glycol, and sulfolane.

It is known to vary the selectivity of such solvents by adding a non-solvent such as water.

Even where a non-solvent is employed, there is an appreciable loss to the raffinate phase of the aromatic hydrocarbons which it is desired to isolate. The extracted phase always contains relatively high quantities of non-aromatic hydrocarbons which must be separated in order to obtain the aromatic hydrocarbons in pure form.

Various processes have been employed to separate the aromatic hydrocarbons from the solvent and non-aromatic hydrocarbons in the extracted phase. For example, the extracted phase is conveyed to an extractive distillation column in which the non-aromatic products are separated at the top of the column, the aromatic constituents are withdrawn laterally, and the solvent is withdrawn at the bottom of the column.

The non-aromatic products, with the solvent, are recycled to the extractor, and the aromatic hydrocarbons which have been isolated are rectified. In most instances, the extractive distillation step required by these methods must be carried out using steam in a vacuum.

Previous processes have required the recycling of large amounts of aromatic products to the extractor together with the paraffinic products which are distilled from the extracted phase. Such processes have not been economical because of the expense required to provide large quantities of steam which was employed in order to separate the aromatic content from the solvent in the extract, through repeated distillations.

In these processes, since organic solvents are employed, there is a certain solvent loss which always occurs due to heat decomposition of a solvent during the distillation step. This entails the necessity of regenerating and purifying at least a part of the solvent.

The non-aromatic constituents can be separated by azeotropic distillation methods using a stripper, when the non-aromatics do not exceed 12% of the mixture.

U.S. Pat. No. 2,407,820 discloses the extraction of aromatic hydrocarbons from a mixture of hydrocarbons containing them by the use of selective solvent such as sulfolane followed by extractive distillation of the extracted phase in order to isolate the aromatic hydrocarbons.

British Pat. 739,200 discloses a process for separation of aromatic hydrocarbons from a mixture thereof with non-aromatic hydrocarbons by extraction of the aromatic hydrocarbons from the mixture with a glycolic selective solvent and then treating the aromatic rich glycolic extract by pre-stripping the extract under evaporative conditions to liberate the most volatile aromatics therefrom together with non-aromatics of equivalent volatility, and thereafter conducting the remaining extract to a heated zone and stripping the aromatic hydrocarbons from the solvent in the heated zone.

Cumming and Morton in the Journal of Applied Chemistry, Aug. 3, 1953, disclose the use of ethylenediamine for extracting benzene from n-hexane on a laboratory scale. Repeated extractions are required to obtain a benzene-free raffinate, but a hexane-free extract of benzene is not attained.

GENERAL DESCRIPTION OF THE INVENTION

The above handicaps of the prior art have been eliminated by the process of this invention.

Accordinng to the present invention, there is provided an improved process for separating aromatic hydrocarbons from a mixture thereof with paraffinic and naphthene hydrocarbons by a unique combination of steps which provides an economical means of separating the aromatic hydrocarbons from mixtures thereof and obtaining such aromatic hydrocarbons in a high degree of purity in high yields.

By the process of this invention, a mixture containing aromatic hydrocarbons is fed to a liquid-liquid extraction zone wherein the aromatic hydrocarbons are extracted by means of ethylenediamine as the selective solvent and are thereafter recovered in pure form by azeotropically distilling the portion of the extracted phase which is loaded with aromatic hydrocarbons and has been freed from the etheylenediamine solvent.

It is an object of the present invention to provide a means for separating very pure aromatic hydrocarbons in exceptionally high yields from hydrocarbon mixtures containing such aromatic hydrocarbons together with paraffin and naphthene hydrocarbons.

It is also an object of this invention to provide a liquid-liquid extraction method for separating an extracted phase having a high aromatic hydrocarbon content and a very low non-aromatic hydrocarbon content from a liquid hydrocarbon mixture.

An additional object of this invention is to provide a method for separating the aromatic hydrocarbons from the extracted phase which is loaded with the aromatic hydrocarbons and some non-aromatics without having to employ extractive distillation.

The process of this invention, in brief, comprises the steps of:

(a) charging the liquid hydrocarbon mixture to be separated to an extraction zone countercurrent to ethylenediamine as the selective solvent;

(b) drawing from the extraction zone a liquid extracted phase loaded with aromatic hydrocarbons and a liquid raffinate phase comprising essentially non-aromatic hydrocarbons;

(c) cooling the extracted phase to obtain a lighter liquid hydrocarbon containing phase and a heavier solvent containing phase;

(d) freeing the lighter phase of aromatic hydrocarbons from solvent by treating the lighter phase of aromatic hydrocarbons with a liquid substance, such as water, which is miscible with the ethylenediamine solvent, but immiscible or little miscible with the aromatic hydrocarbons; and (e) azeotropically distilling the non-aromatic hydrocarbons from the solvent free phase of step (d).

The aromatic hydrocarbon phase obtained after the azeotropic distillation is ultimately rectified to obtain the desired degree of purity of the aromatic hydrocarbons that have been thus separated.

Many advantages are obtained by the utilization of ethylenediamine as a selective solvent in terms of simplicity and high yield of aromatic hydrocarbons. Others will be apparent from the following detailed description of the invention.

DESCRIPTION OF THE PREFERRED EMBODIMENTS

The process of this invention is shown diagrammatically in the accompanying drawing which is a flow sheet of the steps involved in the practice of this invention. As indicated, this invention provides an economical and efficient means for separating aromatic hydrocarbons from mixtures thereof on the industrial scale using as a specific selective solvent ethylenediamine in a novel combination of processing steps.

According to this invention, therefore, aromatic hydrocarbons are efficiently separated from a mixture thereof with paraffins and naphthene hydrocarbons by a process comprises the steps of:

(i) extracting said mixture of liquid hydrocarbons in the liquid phase in an extraction zone at a temperature of about 40° C. to about 80° C. with ethylenediamine solvent having a water content of from 0% to 20% by weight to form an extracted phase and a raffinate phase, said extracted phase comprising predominantly aromatic hydrocarbons and solvent and a minor amount of non-aromatic hydrocarbons, said raffinate phase comprising predominantly non-aromatic hydrocarbons;

(ii) separately collecting said extracted phase and said raffinate phase;

(iii) cooling said extracted phase to a temperature at least 30° C. lower than the temperature of the extraction step (i);

(iv) separating said cooled extracted phase into a heavier solvent containing phase and a lighter hydrocarbons containing phase;

(v) scrubbing said lighter hydrocarbons containing phase with water to obtain an aqueous ethylenediamine containing phase and a hydrocarbons phase;

(vi) azeotropically distilling said hydrocarbons phase to obtain an overhead product comprised of non-aromatic hydrocarbons, and a bottom product consisting essentially of aromatic hydrocarbons;

(vii) rectifying said bottom product consisting essentially of aromatic hydrocarbons.

The ethylenediamine solvent may be employed in an hydrous form or with up to 20% by weight of water. It is preferred that the extraction be carried out using ethylenediamine with a water content of from about 2 to 15% by weight. It has been found that using ethylenediamine with this amount of water, the best conditions in regard to solvent selectivity and solubility towards the aromatic hydrocarbons are obtained. The use of the particular selective solvent according to this invention results in many advantages.

It is essential that low ratios of solvent to the feed charge be maintained. Generally ratios between 1:1 and 4:1 by weight are recommended. Higher ratios may be used, of course, for example, up to 7:1 when the ethylenediamine employed has a high water content.

The extraction is preferably carried out at temperatures between about 40° C. and about 80° C., and at atmospheric pressure. It is possible, although not convenient, to operate at a temperature above 80° C. and at pressures higher than atmospheric pressure, but such is not recommended.

It is recommended that an extractor be employed which has approximately 5 to 15 theoretical trays.

The raffinate phase which is separated in the selective extraction step comprises essentially non-aromatic hydrocarbons. The extracted phase has a very low non-aromatic hydrocarbon content.

The extracted phase containing predominantly aromatic hydrocarbons is collected at the bottom of the extractor and is cooled in order to obtain two liquid phases. The temperature to which the extracted phase is cooled should be at least 30° C. and preferably 40° C. lower than the extraction temperature, and preferably should be between 0° and 30° C. As a result of the cooling, a heavier solvent containing phase which is recycled to the extraction zone, is separated from a lighter hydrocarbon containing phase which is treated as described below to recover the aromatic hydracarbons contained therein.

The lighter phase containing the aromatic hydrocarbons is scrubbed with water in an amount ranging from between 5 and 40% by weight to yield an aqueous ethylenediamine containing phase and an aromatic hydrocarbons phase.

The aromatic hydrocarbons phase is azeotropically distilled, preferably with acetone vapour utilized as the stripper, to remove the non-aromatic hydrocarbons. The residue of the azeotropic distillation contains the aromatic hydrocarbons which are rectified to obtain products that are 99.5% or more pure.

The raffinate phase which is collected from the extractor is scrubbed with water in order to separate the small amount of ethylenediamine solvent that is contained therein. The water is added in such an amount that an aqueous ethylenediamine containing phase is collected having a water content not greater than 50% by weight.

The ethylenediamine selective solvent is recycled to the extraction zone following distillation.

The distillation of the ethylenediamine can be carried out by methods well known in the art, for example, that described in U.S. Pat. No. 3,454,645.

By the process of this invention, liquid hydrocarbon mixtures are extracted which contain several aromatic hydrocarbons or a single aromatic hydrocarbon is recovered from liquid mixture containing them such as benzene from hydrogenated reforming gasoline.

When several aromatic hydrocarbons are extracted, it is preferable to recycle light paraffins to the end of the extraction zone from which the extracted phase is drawn.

In this regard, the lighter fraction may be distilled from the raffinate phase after the raffinate phase has been freed from the solvent. The recycle also may be employed when extracting a single aromatic hydrocarbon from the liquid mixtures containing it especially where the mixture contains non-aromatic hydrocarbons having a number of carbon atoms higher than the number of carbon atoms in the aromatic hydrocarbon.

In the accompanying drawing, there is shown a schematic diagram of the steps employed in the process of this invention. The apparatus employed is all of a conventional nature familiar to those in the art and is not shown in detail.

Referring to this drawing, a conventional multistage extractor 1 such as a perforated tray column, or a column containing a packing material or a rotating disc contactor is employed for the extraction step.

The liquid hydrocarbon mixture containing the aromatic hydrocarbons to be separated is fed to the extractor 1 through a feed line 7 at a point intermediate the top and the bottom of the extractor 1. The selective solvent comprising ethylenediamine is fed to the extractor 1 through a feed line 8 at the end of the extractor 1 at which the raffinate phase is collected.

The extracted phase, containing predominantly aromatic hydrocarbons, is collected at the bottom of the extractor 1. This extracted phase containing the aromatic hydrocarbons is then fed through the line 9 to a heat exchanger 27, cooled, and then fed through line 28 to decanter 2.

The extracted phase is separated into two liquid phases in the decanter 2. The heavier, solvent containing, phase is recycled through the line 11 to the extractor 1 at a point intermediate between the feeding point of the ethylenediamine selective solvent and the feeding point of the hydrocarbon mixture.

The lighter hydrocarbon containing phase is fed from the decanter 2 to a scrubbing column 3 through line 12. Water is fed to the scrubbing column 3 through line 13. The lighter hydrocarbon containing phase from the decanter 2 is separated into two liquid phases, an aqueous ethylenediamine containing phase which is drawn from the bottom of the scrubbing column 3, and a hydrocarbon phase which is drawn from the top of the column 3.

The aqueous ethylenediamine containing phase is in turn fed through lines 15 and 24 to a distilling column 5.

The hydrocarbon containing phase is fed to an azeotropic distilling column 4 through line 14. Acetone vapor is fed to the distilling column 4 through feed line 16. Non-aromatic hydrocarbons together with acetone vapors are discharged from the azeotropic distilling column 4 through line 17. The aromatic hydrocarbons are removed from the bottom of the azeotropic distilling column 4 through line 18 and are subsequently rectified.

The non-aromatic hydrocarbons together with the acetone discharged from the column 4 through line 17 are scrubbed with water and separated into two phases, an aqueous acetone containing phase and a non-aromatic hydrocarbons phase according to conventional methods.

The raffinate phase which is drawn from the extractor 1 through line 10 is scrubbed countercurrent with water in a scrubbing column 6. The water is fed to the column 6 through feed line 23. The non-aromatic hydrocarbons in the raffinate phase are removed through line 22. The non-aromatic hydrocarbons of the raffinate phase thus freed from solvent may be distilled to get paraffins which optionally may be recycled to the extraction zone at the extracted phase end. Thus, the non-aromatic hydrocarbons may be fed by line 22 to distillation column 25, and the paraffins obtained recycled through line 26 to the extractor 1 at the extracted phase end.

An aqueous ethylenediamine containing phase is drawn from the bottom of the column 6 and is fed through line 21 and line 24 to the distillation column 5. Aqueous ethylenediamine is also fed to the column 5 from line 15 from the column 3 as mentioned above.

The aqueous ethylenediamine is distilled in distilling column 5 according to methods known in the art, for example, by the process described in U.S. Pat. No. 3,454,645. The ethylenediamine is recycled from column 5 to extractor 1 through the line 19.

The practice of this invention is illustrated by an example in which a hydrocarbon mixture which contains 55% by weight of aromatic hydrocarbons comprising benzene, toluene, and xylene, together with 45% by weight of non-aromatic hydrocarbons whose number of carbon atoms range between 6 and 8, is separated into non-aromatic and aromatic hydrocarbons. The mixture to be separated does not contain any unsaturated hydrocarbons.

The hydrocarbon mixture to be separated is fed to the extractor 1 through feed line 7 at the rate of 100 kg./hr. The extractor 1 in this case is a rotating disc contactor having twelve theoretical trays. The hydrocarbon mixture is fed to the extractor 1 at the fourth theoretical tray counting from the end from which the raffinate phase is collected.

Aqueous ethylenediamine selective solvent containing approximately 10% by weight of water, recycled from the distilling column 5 as described, is fed to the extractor 1 through line 8 from line 19 at the rate of 15 kg./hr. The aqueous ethylenediamine solvent is fed to the extractor 1 at the first theoretical tray at the end from which the raffinate phase is collected.

The temperature of the extraction column is maintained at 60° C., and atmospheric pressure is employed.

Light paraffins from the distilling column 25 are fed through line 26 to the extractor 1 at the first theoretical tray at the end from which the extracted phase is drawn at the rate of approximately 13 kg./hr. The paraffins which have an average carbon content of 6 carbon atoms have been distilled from the raffinate phase after the latter has been separated from the minor amounts of aqueous ethylenediamine solvent as described above.

The raffinate phase is drawn from the top of the extractor 1 through line 10 and has the following average composition:

| | Percent by weight |
|---|---|
| Non-aromatic hydrocarbons | 92.1 |
| Aromatic hydrocarbons | 2.1 |
| Solvent | 5.8 |

The extracted phase is drawn from the foot of the extractor 1 through line 9 and has the following average composition:

| | Percent by weight |
|---|---|
| Non-aromatic hydrocarbons | 26.0 |
| Aromatic hydrocarbons | 1.0 |
| Solvent | 73.0 |

The extracted phase is fed to a decanter 2 through line 28 following cooling in heat exchanger 27 to a temperature of about 20° C. In the decanter 2, the extracted phase is separated into two liquid phases.

The heavier of the phases has a solvent content of approximately 82.8% by weight and is recycled to the extractor 1 through line 11 to the third theoretical tray of the extractor, counting from the end at which the raffinate phase is collected.

The lighter phase has an aromatic hydrocarbon content of about 78.8% by weight. It is fed to the scrubbing column 3 through line 12. Water is introduced to the scrubbing column 3 through feed line 11 at the rate of about 14 kg./hr.

An aqueous ethylenediamine is drawn from the foot of the column 3 through line 15 and in turn is fed to the distilling column 5 through line 24.

The hydrocarbon constituents are removed from the top of the scrubbing column 3 and fed to an azeotropic distillation column 4 through line 14. In the azeotropic distillation column 4, acetone vapor is fed at the base thereof at the rate of about 15 kg./hr. through line 16.

The aromatic hydrocarbons are drawn from the bottom of the azeotropic distillation column 4 through line 18 at about 53 kg./hr. and are thereafter fractionated to end products which are 99.6% pure.

The raffinate phase which is drawn from the top of extractor column 1 is fed through line 10 to the scrubbing column 6. Water is fed to the scrubbing column 6 at the top thereof through feed line 23, at the rate of about 1 kg./hr. Aqueous ethylenediamine is drawn from the foot of the scrubbing column 6 and fed to the distillation column 5 through lines 21 and 24, where it is distilled according to the process of U.S. Pat. 3,454,645. The aqueous ethylenediamine obtained from the distilling column 5 is approximately 90% by weight ethylenediamine and is recycled to extractor 1 through lines 19 and 8 as described. Water is removed from the base of the column 5 through line 20.

The solvent free raffinate phase is fed from the scrubber 6 through line 22 to distillation column 25 and distilled to obtain a light hydrocarbon fraction which is fed through line 26 to the bottom of the extractor 1 as described above.

What is claimed is:

1. A process for separating aromatic hydrocarbons from a mixture of liquid hydrocarbons comprising said aromatic hydrocarbons, paraffins and naphthene hydrocarbons, which process comprises the steps:
   (i) extracting said mixture of liquid hydrocarbons in the liquid phase in an extraction zone at a temperature of about 40° C. to about 80° C. with ethylenediamine solvent having a water content of from 0% to 20% by weight to form an extracted phase and a raffinate phase, said extracted phase comprising predominantly aromatic hydrocarbons and solvent and a minor amount of non-aromatic hydrocarbons, said raffinate phase comprising predominantly non-aromatic hydrocarbons;
   (ii) separately collecting said extracted phase and said raffinate phase;
   (iii) cooling said extracted phase to a temperature at least 30° C. lower than the temperature of the extraction step (i);
   (iv) separating said cooled extracted phase into a heavier solvent containing phase and a lighter hydrocarbons containing phase;
   (v) scrubbing said lighter hydrocarbons containing phase with water to obtain an aqueous ethylenediamine containing phase and a hydrocarbons phase;
   (vi) azeotropically distilling said hydrocarbons phase to obtain an overhead product comprising non-aromatic hydrocarbons, and a bottom product consisting essentially of aromatic hydrocarbons;
   (vii) rectifying said bottom product consisting essentially of aromatic hydrocarbons.

2. A process as claimed in claim 1 wherein said ethylene-diamine solvent of step (i) has a water content of from about 2% to about 15% by weight.

3. A process as claimed in claim 1 wherein the ratio of ethylene-diamine solvent to said mixture of liquid hydrocarbons in step (i) is from 1:1 to 4:1 by weight.

4. A process as claimed in claim 1 wherein said extracted phase is cooled to a temperature at least 40° C. lower than the temperature of the extraction step (i).

5. A process as claimed in claim 1 wherein said extracted phase is cooled to a temperature between 0° and 30° C.

6. A process as claimed in claim 2 wherein the ratio of ethylene-diamine solvent to said mixture of liquid hydrocarbons in step (i) is from 1:1 to 4:1 by weight.

7. A process as claimed in claim 6 wherein said extracted phase is cooled to a temperature between 0° and 30° C.

8. A process as claimed in claim 1 wherein in step (vi) said hydrocarbon phase is azeotropically distilled by means of acetone vapor to obtain an overhead product consisting essentially of acetone and non-aromatic hydrocarbons, and a bottom product consisting essentially of aromatic hydrocarbons.

9. A process as claimed in claim 1 wherein said heavier solvent containing phase of step (iv) is recycled to said extraction zone and said raffinate phase collected in step (ii) is scrubbed with water and there is obtained an ethylenediamine-free raffinate phase of non-aromatic hydrocarbons and an aqueous ethylenediamine containing phase.

10. A process as claimed in claim 9 wherein the aqueous ethylenediamine containing phase of step (v) and that obtained by scrubbing the raffinate phase are distilled, and the ethylenediamine obtained thereby is recycled to the extraction zone in step (i).

References Cited
UNITED STATES PATENTS

| | | | |
|---|---|---|---|
| 3,639,496 | 2/1972 | Rozman | 260—674 SE |
| 2,999,892 | 9/1961 | Papadopoulos | 260—674 SE |
| 3,291,728 | 12/1966 | Boyum et al. | 208—331 |
| 3,209,047 | 9/1965 | Young | 260—674 SE |
| 3,431,199 | 3/1969 | Ren et al. | 260—674 SE |

WILBUR L. BASCOMB, Jr., Primary Examiner

U.S. Cl. X.R.

203—39, 59, 62, 84, 53; 260—674 SE